March 26, 1957 R. R. GEARY 2,786,935
UNDER FENDER LIGHTS FOR VEHICLES
Filed June 17, 1955 2 Sheets-Sheet 1

Robert R. Geary
INVENTOR.

BY *Clarence A. O'Brien*
*and Harvey B. Jackson*
Attorneys

March 26, 1957 R. R. GEARY 2,786,935
UNDER FENDER LIGHTS FOR VEHICLES
Filed June 17, 1955 2 Sheets-Sheet 2
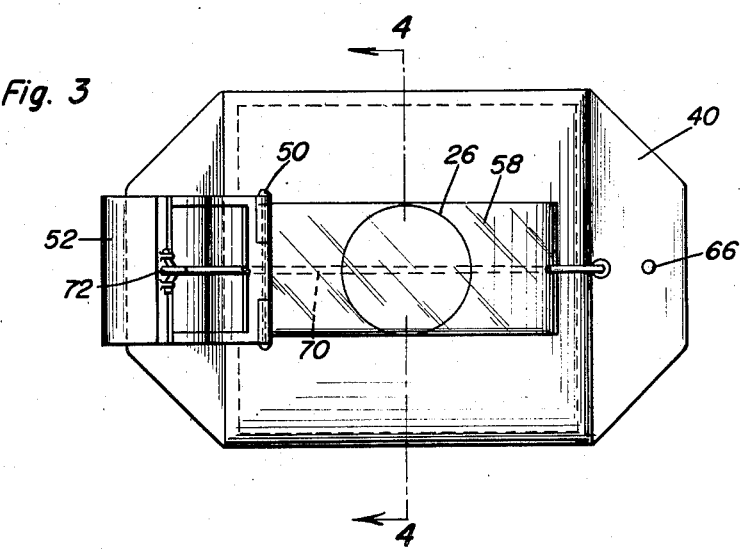
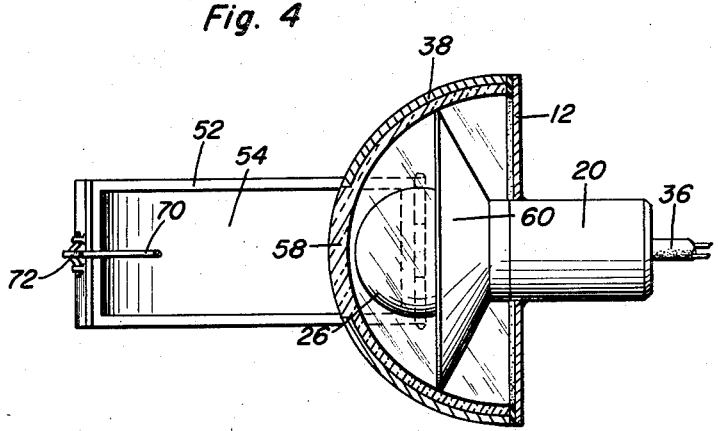
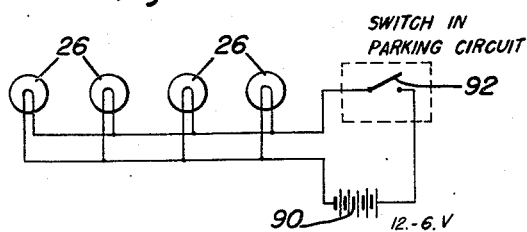
Robert R. Geary
INVENTOR.

United States Patent Office 2,786,935
Patented Mar. 26, 1957

2,786,935

UNDER FENDER LIGHTS FOR VEHICLES

Robert R. Geary, Stockton, Calif., assignor of thirty-five percent to Norma Jean McKinley, Stockton, Calif.

Application June 17, 1955, Serial No. 516,219

2 Claims. (Cl. 240—8.1)

This invention relates to an attachment for automotive vehicles and more particularly to illuminating means adapted to be mounted so as to direct rays of light outwardly and downwardly from the interior of the fenders of a vehicle.

The primary object of the present invention resides in the provision of under fender lights for vehicles which are completely sealed from mud, water, etc., by a suitable shell and cover which are adapted to overlie a glass globe, yet which is capable of being actuated so as to permit light rays to be directed so as to give efficient light for tire changes, putting on chains, checking springs, while also providing for clearance along a vehicle for the protection that this may afford.

A further object of the invention resides in the provision of an under fender light for vehicles which includes a hinge cover operable by means of a flexible cable attached thereto, which flexible cable is attached to an operating lever mounted on the instrument panel of the vehicle.

A further object of the invention resides in the provision of an under fender light for a vehicle which is installed so as to be invisible to an observer of the vehicle, thereby not adversely affecting the outward appearance of the vehicle.

Still further objects and features of this invention reside in the provision of an under fender light vehicle that is simple in construction, highly efficient in operation, and which is relatively inexpensive to install thereby permitting wide distribution and utilization.

These, together with the various ancillary objects and features of the invention which will become apparent as the following description proceeds, are attained by these under fender lights for vehicles, a preferred embodiment of which has been illustrated in the accompanying drawings, by way of example only, wherein:

Figure 3 is a side elevational view of the under fender lights;

Figure 4 is a vertical sectional view as taken along the plane of line 4—4 of Figure 3;

Figure 6 is a circuit diagram of the under fender lights.

Figure 1:
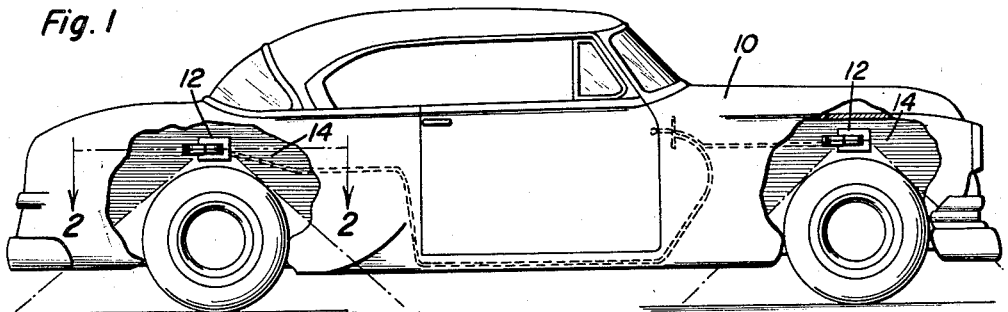
Figure 1 is an elevational view of a vehicle having the under fender light installed therein with parts of the fenders being broken away to show the position of the under fender lights on the splash shields of the fenders of the vehicle.
Figure 2:
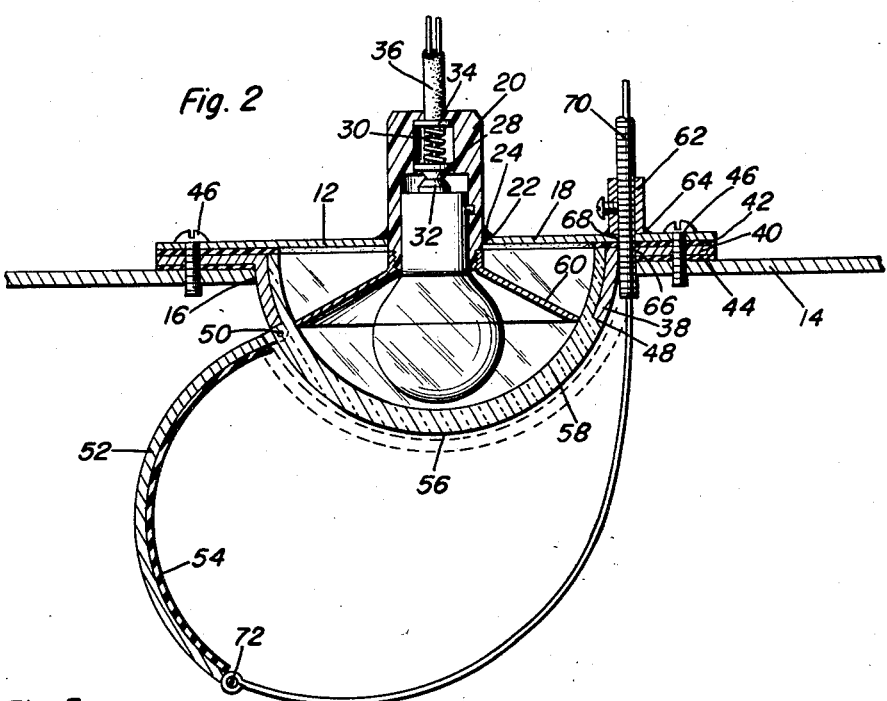
Figure 2 is an enlarged horizontal sectional view as taken along the plane of line 2—2 in Figure 1.
Figure 5:
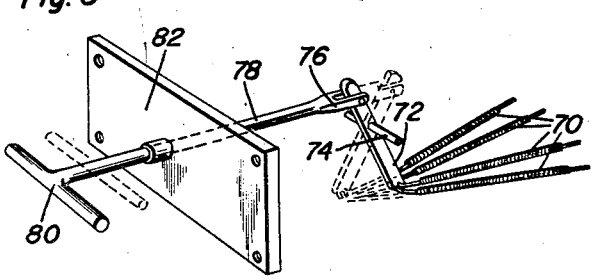
Figure 5 is a perspective view of the actuating mechanism for the hinge cover.

With continuing reference to the accompanying drawings wherein like reference numerals designate similar parts throughout the various views, reference numeral 10 generally designates a vehicle having the under fender lights 12 comprising the present invention attached to the flash shield 14 of each fender of the vehicle. As can be seen best in Figure 2, the flash shield 14 on each of the fenders is provided with an opening as at 16 therethrough. The under fender lights 12 each include a mounting plate 18 to which a lamp socket 20 is suitably attached.

The lamp socket 20 extends through an opening 22 in the mounting plate 18 and is sealed by any suitable means as at 24 so as to prevent water, mud, or the like from penetrating into the interior of the light 12. Positioned in the lamp socket 20 is a light bulb 26. A spring pressed contact 28 urged by spring 30 into engagement with the base contact 32 of the lamp bulb 26 may be provided and connected to the plate 34 at the base of the lamp socket is one of the conductors 36 the other of which is connected to the other contact of the lamp bulb 26 in the conventional manner.

A semi-cylindrical shell 38 is provided having a flange 40. A suitable gasket 42 is positioned between the flange 40 and the mounting plate 18. Positioned between the flange 40 and the flash shield 14 is another gasket 44. Suitable screws, bolts, or other fasteners 46 extend to the mounting plate 18, the gasket 42, the flange 40, the gasket 44 and the flash shield 14 to hold the entire assembly in position.

The shell 38 is provided with an opening 48 therethrough. Hingedly secured to the shell 38 as at 50 is a cover 52 provided with a resilient gasket 54 for engagement with a projecting portion 56 of a transparent member 58 in the form of a glass globe or the like of semi-cylindrical shape and retained between the shell 38 and the mounting plate 18.

Threadedly secured on the lamp socket 20 or mountable by any other suitable means is a reflector 60.

A cylindrical member 62 is welded or otherwise secured as at 64 to the mounting plate 18 in alignment with aligned apertures as at 66 and 68 in the flange 40 and the mounting plate 18 respectively. Extending through the cylindrical member 62, and the opening 66 and 68 is a flexible cable 70 one end of which is attached as at 72 to the cover 52. The other end of each of the flexible cables 70 which are connected to the covers 52 are attached to a crank 74 pivotally mounted by means of a pivot on the vehicle and having the bifurcated end 76 of the shaft 78 of an operating handle 80 attached thereto. The operating handle 80 is slidable within the instrument panel or an associated bracket 82 of the vehicle. Hence, upon operation of the handle 80, the cover 52 may be opened or closed. If electrical energy is passing into the light bulb 26, light rays will emanate through the projecting portion 56 of the transparent member 58 to thereby direct light rays in a manner so as to pass outwardly and below the respective fenders of the vehicle.

The lamps 26 are connected in parallel connection with the battery 90 of the vehicle and the switch 92 which normally controls the parking lights of the vehicle.

It is to be recognized that one of the advantages of this invention is that the entire device is sealed from mud, water, and the like with the transparent member 58 normally protected from being covered with mud or other defacing matter when the under fender lights are not in use. The projecting portion 56 which sits flush with the outer surface of the body shell 38 provides a substantially rattle-free arrangement for the under fender lights.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restorted to, falling within the scope of the invention as claimed.

What is claimed as new is as follows:
1. An under fender light attached to a flash shield of fender of a vehicle comprising a mounting plate carrying a lamp socket, a lamp in said socket, a shell having an opening therein, a transparent member between said plate and said shell and sealing said opening, a cover hingedly secured to said shell for overlying said opening to prevent light rays from passing out of said under fender light, said shell and said transparent member being substantially semi-cylindrical in shape, said transparent member having a portion projecting into said opening and lying flush with the outer surface of said shell.

2. An under fender light attached to a flash shield of a fender of a vehicle comprising a mounting plate carrying a lamp socket, a lamp in said socket, a shell having an opening therein, a transparent member between said plate and said shell and sealing said opening, a cover hingedly secured to said shell for overlying said opening to prevent light rays from passing out of said under fender light, said shell and said transparent member being substantially semi-cylindrical in shape said transparent member having a portion projecting into said opening and lying flush with the outer surface of said shell, and means connected to said cover extending to the instrument panel of the vehicle for opening and closing said cover.

References Cited in the file of this patent

UNITED STATES PATENTS

| | | |
|---|---|---|
| 1,145,087 | Shaw | July 6, 1915 |
| 1,152,182 | Kaufman | Aug. 31, 1915 |
| 1,443,290 | Strong | Jan. 23, 1923 |
| 1,704,894 | Hendrickson | Mar. 12, 1929 |
| 2,325,403 | Illiano | July 27, 1943 |
| 2,388,787 | Kuschel | Nov. 13, 1945 |
| 2,553,187 | Goolsby | May 15, 1951 |

FOREIGN PATENTS

| | | |
|---|---|---|
| 611,373 | France | Feb. 19, 1926 |